US012566755B2

(12) United States Patent
Ahuja et al.

(10) Patent No.: US 12,566,755 B2
(45) Date of Patent: Mar. 3, 2026

(54) SYSTEM AND A METHOD FOR INFORMATION RETRIEVAL USING QUERY AWARE EXTENDED CHUNKS

(71) Applicant: ACCENTURE GLOBAL SOLUTIONS LIMITED, Dublin (IE)

(72) Inventors: Manish Ahuja, Bangalore (IN); Narendranath Sukhavasi, Nizamabad (IN); Kapil Singi, Bangalore (IN); Swapnajeet Choudhury, Bangalore (IN); Vibhu Saujanya Sharma, Bangalore (IN); Vikrant Kaulgud, Bangalore (IN); Pragya Sharma, Mumbai (IN); Teresa Sheausan Tung, Los Angeles, CA (US); Adam Patten Burden, Singapore (SG)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/814,040

(22) Filed: Aug. 23, 2024

(65) Prior Publication Data

US 2026/0056942 A1 Feb. 26, 2026

(51) Int. Cl.
*G06F 16/242* (2019.01)
*G06F 16/23* (2019.01)

(52) U.S. Cl.
CPC ...... *G06F 16/2425* (2019.01); *G06F 16/2365* (2019.01)

(58) Field of Classification Search
CPC ............. G06F 16/3329; G06F 16/3347; G06F 16/332; G06F 16/3344; G06F 16/432;
(Continued)

(56) References Cited

U.S. PATENT DOCUMENTS 6,067,547 A * 5/2000 Douceur ............. G06F 16/2255
707/999.102
11,481,656 B2 * 10/2022 Wan ...................... G06N 3/044
(Continued)

FOREIGN PATENT DOCUMENTS

CN 115130749 A * 9/2022 ............. G06N 3/126
WO WO-2024205600 A1 * 10/2024 ......... G06F 16/9038

OTHER PUBLICATIONS

B. Saha, U. Saha and M. Zubair Malik, "QuIM-RAG: Advancing Retrieval-Augmented Generation With Inverted Question Matching for Enhanced QA Performance," in IEEE Access, vol. 12, pp. 185401-185410, 2024 (Year: 2024).*
(Continued)

*Primary Examiner* — Dennis Truong
(74) *Attorney, Agent, or Firm* — Mannava & Kang, P.C.

(57) ABSTRACT

Methods, systems, and computer-readable storage media for information retrieval using query aware extended chunks. For retrieving relevant information from a foundation model, a plurality of chunks substantially relevant to a query are identified, the plurality of chunks containing information relevant to the query. Based on the plurality of chunks, one or more semantically similar chunks are identified for one or more of the plurality of chunks substantially relevant to the query. By combining the one or more semantically similar chunks with the respective one or more of the plurality of chunks, one or more extended chunks are generated. Based on one or more objectives, a subset of the one or more extended chunks is selected. The query and the selected subset are inputted as a context to the foundation model for retrieving relevant information from the foundation model.

17 Claims, 9 Drawing Sheets

(58) Field of Classification Search
CPC ............. G06F 16/9032; G06F 16/2425; G06F
16/2365; G06F 40/30; G06F 40/284;
G06F 16/242; G06F 16/383; G06F 18/22
See application file for complete search history.

(56)                    References Cited

U.S. PATENT DOCUMENTS

| 12,039,263 | B1 * | 7/2024 | Mondlock | G06F 40/20 |
|---|---|---|---|---|
| 12,242,468 | B1 * | 3/2025 | Brenner | G06F 16/242 |
| 12,299,081 | B1 * | 5/2025 | Asi | G06F 16/345 |
| 2021/0191640 | A1 * | 6/2021 | Ponnala | G06F 3/0641 |
| 2022/0382805 | A1 * | 12/2022 | Saxena | G06F 16/5846 |
| 2024/0265041 | A1 * | 8/2024 | Rennie | G06F 16/93 |
| 2024/0403341 | A1 * | 12/2024 | Berglund | G06F 16/3326 |
| 2025/0036878 | A1 * | 1/2025 | Marwah | G06F 40/30 |
| 2025/0053835 | A1 * | 2/2025 | Stephan | G06N 5/04 |
| 2025/0131289 | A1 * | 4/2025 | Larson | G06N 5/02 |
| 2025/0165463 | A1 * | 5/2025 | Brenner | G06F 16/242 |
| 2025/0200491 | A1 * | 6/2025 | Anwade | G06Q 30/015 |

OTHER PUBLICATIONS

Ofer Mendelevitch, "Retrieval Augmented Generation (RAG) Done Right: Chunking", Sep. 20, 2023, 13, pages. <https://vectara.com/blog/grounded-generation-done-right-chunking/>.

Pei-Chi Lo, Ee-Peng Lim, "Contextual Path Retrieval: A Contextual Entity Relation Embedding-based Approach", ACM Transactions on Information Systems, vol. 41, No. 1, Article 1, Jan. 2023, 38 pages.

Stanimira Vlaeva et al., "Do you need a specialized vector database to implement vector search well?" Stackoverflow. blog, Sep. 20, 2023, 13 pages. <https://stackoverflow.blog/2023/09/20/do-you-need-a-specialized-vector-database-to-implement-vector-search-well/>.

Vishal Padma, "Azure Vector Search: A new way of information retrieval in diverse data types", Jan. 17, 2024, 13 pages. <https://medium.com/version-1/azure-vector-search-a-new-way-of-information-retrieval-in-diverse-data-types-c7e271996ece>.

Md Adnan Arefeen et al., "LeanContext: Cost-Efficient Domain-Specific Question Answering Using LLMs", Arxiv, Sep. 2, 2023, 8 pages. <https://arxiv.org/pdf/2309.00841>.

Hailin Zhang et al., "Model-enhanced Vector Index", Nov. 9, 2023, 14 pages. <https://arxiv.org/pdf/2309.13335>.

Sean Chester et al., "Indexing for Vector Projections" In: Yu, J.X., Kim, M.H., Unland, R. (eds) Database Systems for Advanced Applications. DASFAA (Year 2011). Lecture Notes in Computer Science, vol. 6588, pp. 367-376 (Year 2011) <https://doi.org/10.1007/978-3-642-20152-3_27>.

Rita Ramos et al., "Retrieval-augmented Image Captioning", arXiv, Feb. 16, 2023, 16 pages. <https://arxiv.org/pdf/2302.08268>.

* cited by examiner

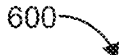

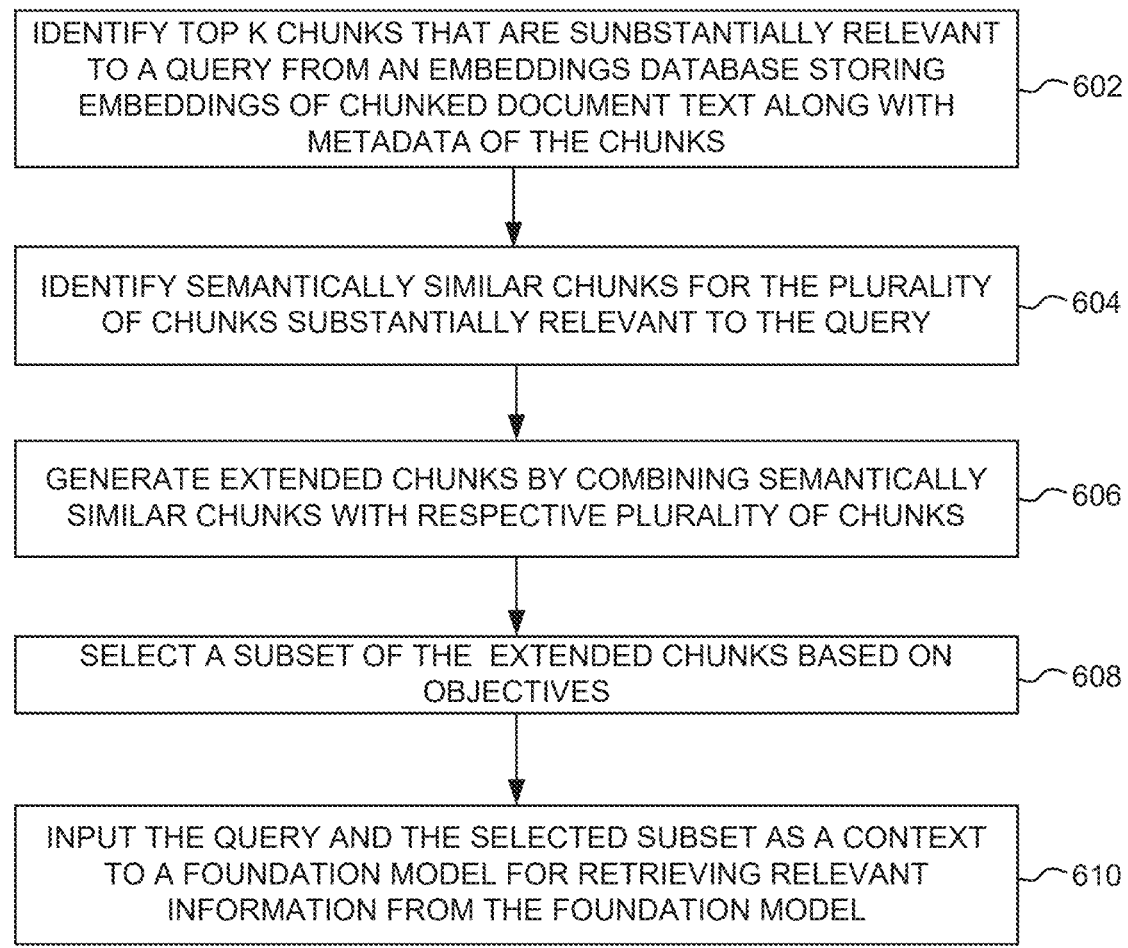

600

IDENTIFY TOP K CHUNKS THAT ARE SUNBSTANTIALLY RELEVANT TO A QUERY FROM AN EMBEDDINGS DATABASE STORING EMBEDDINGS OF CHUNKED DOCUMENT TEXT ALONG WITH METADATA OF THE CHUNKS ⟋602

IDENTIFY SEMANTICALLY SIMILAR CHUNKS FOR THE PLURALITY OF CHUNKS SUBSTANTIALLY RELEVANT TO THE QUERY ⟋604

GENERATE EXTENDED CHUNKS BY COMBINING SEMANTICALLY SIMILAR CHUNKS WITH RESPECTIVE PLURALITY OF CHUNKS ⟋606

SELECT A SUBSET OF THE EXTENDED CHUNKS BASED ON OBJECTIVES ⟋608

INPUT THE QUERY AND THE SELECTED SUBSET AS A CONTEXT TO A FOUNDATION MODEL FOR RETRIEVING RELEVANT INFORMATION FROM THE FOUNDATION MODEL ⟋610

FIG. 6

SYSTEM AND A METHOD FOR INFORMATION RETRIEVAL USING QUERY AWARE EXTENDED CHUNKS

FIELD OF THE INVENTION

The present disclosure generally relates to the field of data processing and foundation models, and more particularly to a system and a method for information retrieval using query aware extended chunks.

BACKGROUND

In contemporary information retrieval technologies, there is an emphasis on precision and context-awareness across different sectors. Sophisticated data processing techniques are relied upon to extract accurate information from complex datasets. Addressing challenges related to semantic accuracy and contextual relevance underscores the ongoing need for advanced methodologies capable of dynamically adapting and integrating semantic nuances effectively.

SUMMARY

Implementations of the present disclosure are generally directed to generation of context information including extended chunks for a foundation model. The extended chunks are generated by identifying k nearest chunks or top k relevant chunks and extending each of the k-nearest chunks. The generated extended chunks are context-aware due to the extension. Additionally, the k nearest extended chunks are thereby utilized to provide context to a foundation model for responding to a user query. Leveraging the extended chunks for information retrieval reduces computational time required, and enhances accuracy of foundation models. Thereby, the proposed system and method provide technical solutions to the technical problem of improving the accuracy of foundation models while complying with the model constraints. For example, current size constraints of Large Language Models (LLMs) may limit input to 12 rows of insights data. However, certain applications or use cases may require vast amounts of insight data, for example, over a hundred thousand rows of insights data, to be provided and such input data requirements are expected to grow significantly with the increasing sophistication of applications. The extension of chunks enables providing more accurate context information in a compact manner thereby improving the accuracy of the model outputs.

The proposed system and method transform the field of information retrieval, making the information retrieval process faster, efficient, accurate, and complete. In general, innovative aspects of the subject matter described in this specification provide a system. The system includes, at least one processor and at least one non-transitory processor-readable medium storing instructions to be executed by the at least one processor. The at least one processor is configured to identify a plurality of chunks substantially relevant to a query, the plurality of chunks containing information relevant to the query, identify one or more semantically similar chunks for one or more of the plurality of chunks substantially relevant to the query, generate one or more extended chunks by combining the one or more semantically similar chunks with the respective one or more of the plurality of chunks, select a subset of the one or more extended chunks based on one or more objectives, and input the query and the selected subset as a context to a foundation model for retrieving relevant information from the foundation model.

The present disclosure further describes a method for generating extended chunks and for information retrieval using the generated extended chunks. The present disclosure also describes non-transitory processor readable storage medium coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DRAWINGS

Various embodiments in accordance with the present disclosure will be described with reference to the drawings, in which.

FIGS. 5A, 5B, 5C, 5D, 5E, and 5F depict graphical representations of vector spaces having embeddings for chunks and queries in accordance with implementations of the present disclosure.

FIG. 6 is a flow diagram presenting an exemplary method in accordance with implementations of the present disclosure.

Figure 7:
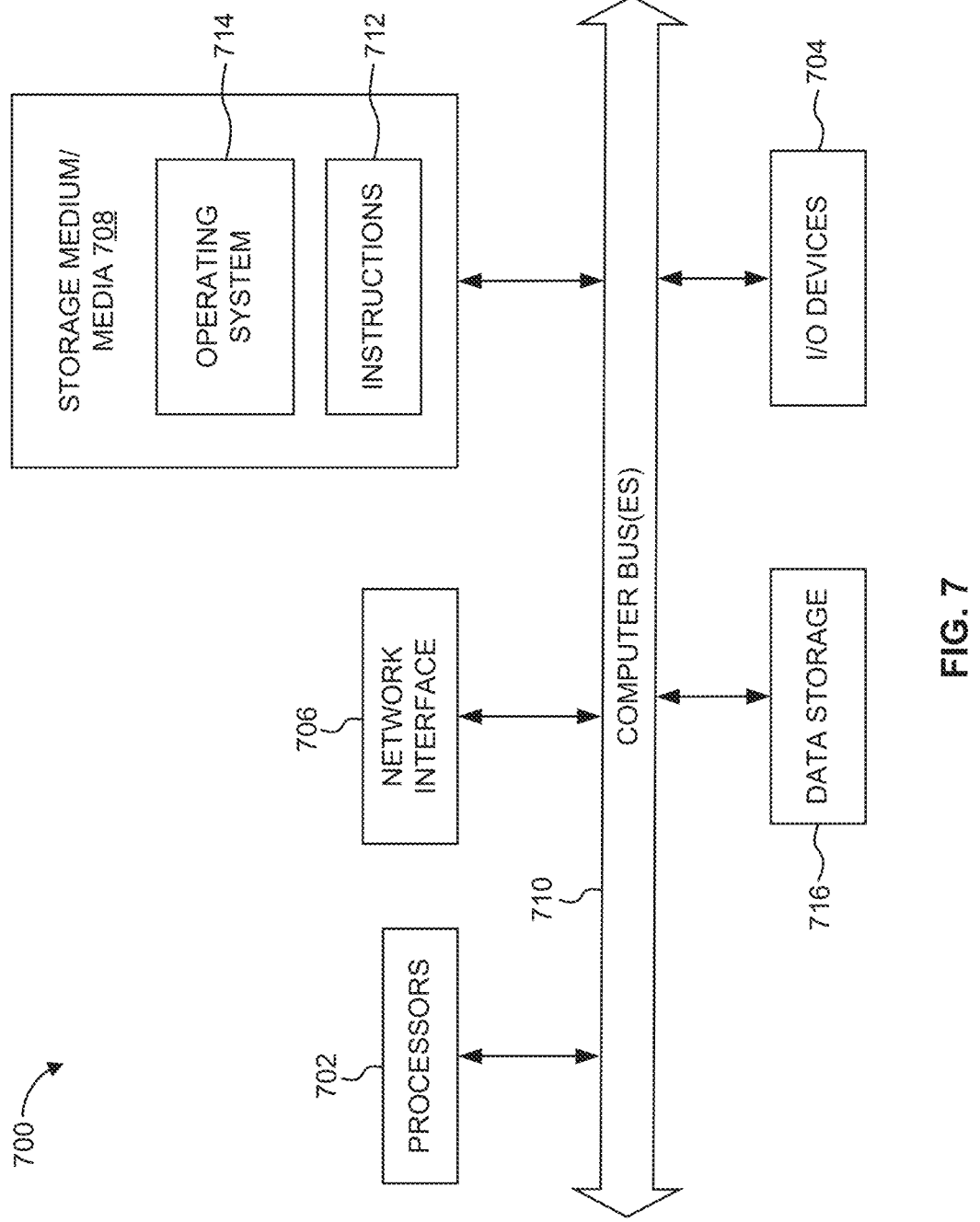

FIG. 7 illustrates a computer system that may be used to implement the knowledge system.

Like reference numbers and designations in the various drawings indicate like elements.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, systems, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

Traditional methods of information retrieval have historically relied on structured databases and keyword-based searches to extract pertinent information from datasets. However, these approaches often struggle to capture nuanced contextual dependencies and semantic relationships within data, resulting in incomplete or inaccurate outputs. Consequently, decision-making processes across various domains are hampered by the limitations of these conventional retrieval methodologies.

With the advent of technology, significant advancements in information retrieval have been realized, particularly through the application of machine learning algorithms and sophisticated data processing techniques. Artificial Intelligence (AI) driven systems can now navigate complex datasets more effectively, extracting and presenting information with enhanced accuracy and relevance. Despite these advancements, challenges such as hallucinations, where incorrect contextual information is retrieved, persist, impacting the reliability of retrieved data and complicating decision-making processes.

Moreover, the complexity inherent in semantic relationships within datasets continues to present challenges for contemporary AI-driven information retrieval systems. Current methodologies often struggle to navigate these intricacies, potentially overlooking critical semantic nuances in the process. These limitations underscore the ongoing necessity for advanced approaches capable of dynamically adapting to and incorporating semantic intricacies, thereby enhancing the precision and utility of retrieved information across diverse application scenarios.

In view of this, implementations of the present disclosure generate extended chunks within the knowledge retrieval framework. The extended chunks enhance the precision and relevance of retrieved information by dynamically generating context-aware chunks based on semantic similarity metrics within the embedding space. By optimizing the transmission of precise contextual data to foundation models, this approach significantly improves the efficiency and effectiveness of information/knowledge retrieval processes, thereby reducing reliance on manual intervention and mitigating the drawbacks associated with traditional and AI-driven retrieval methods.

Figure 1:
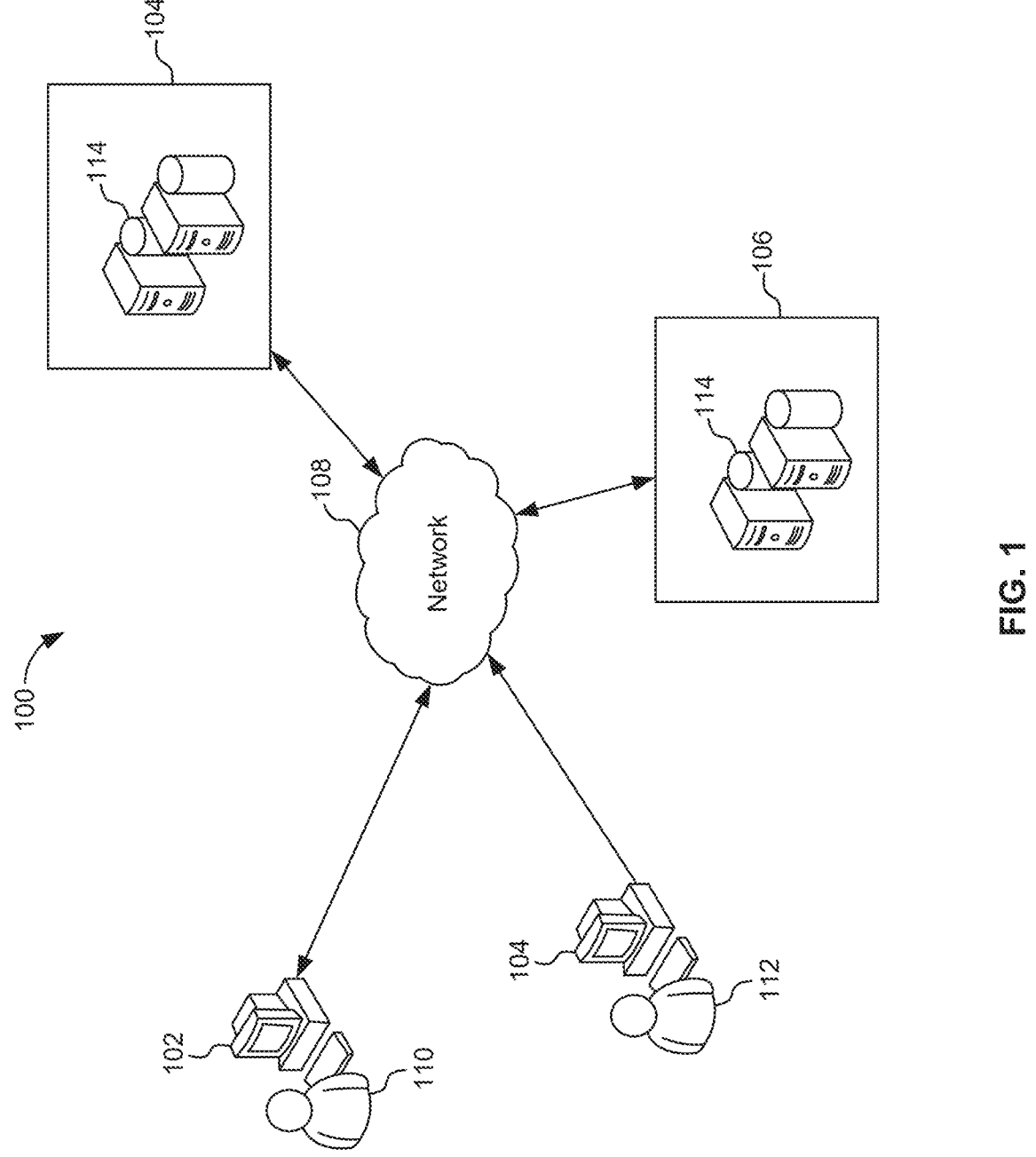
FIG. 1 depicts an example environment that may be used to execute implementations of the present disclosure.

FIG. 1 depicts an example environment 100 that may be used to execute implementations of the present disclosure. In some examples, the example environment 100 enables generation of extended chunks for retrieving information for a user query.

As depicted in FIG. 1, the example environment 100 includes computing devices 102 and 104, back-end systems 106, and a network 108. In some examples, the computing devices 102 and 104 are used by respective users 110 and 112 to log into and interact with computing platforms executing applications according to implementations of the present disclosure. Examples of the computing devices 102 and 104 may include desktop computing devices, smartphones, laptops, tablet, voice-enabled devices, and/or the like. It is contemplated that implementations of the present disclosure may be realized with any appropriate type of computing device. In some examples, each of the computing devices 102 and 104 may include a web browser application executed thereon, which may be used to display one or more web pages of a computing platform executing applications. In some examples, each of the computing devices 102 and 104 may display one or more Graphical User Interfaces (GUIs) that enable the respective users 110 and 112 to interact with the computing platform.

In some examples, the network 108 includes a Local Area Network (LAN), a Wide Area Network (WAN), the Internet, or a combination thereof, and connects web sites, the computing devices 102 and 104, and the back-end systems 106. In some examples, the network 108 may be accessed over a wired and/or a wireless communication link. For example, a computing device like smartphone may utilize a cellular network to access the network 108.

In some examples, one or more of the back-end systems 106 may be implemented as an on-premises system that is operated by an enterprise or a third-party engaged in cross-platform interactions and data management. In some examples, the back-end systems 106 may be implemented as an off-premises system (for example: cloud or on-demand) that is operated by an enterprise or a third-party on behalf of an enterprise. In some examples, one or more of the back-end systems 106 may be implemented in a cloud environment. For simplicity, the back-end systems 106 depicted in FIG. 1 may be a cloud environment that is intended to represent various forms of servers including a web server, an application server, a proxy server, a network server, a server pool, and/or the like.

In some examples, each of the back-end systems 106 includes one or more knowledge systems 114 to host components (for example, knowledge embeddings) for information retrieval. Further, the knowledge system 114 accepts requests from the users 110 and 112 through the respective computing devices 102 and 104 for services being provided by the knowledge system 114. In response to the accepted requests, the knowledge system 114 provides the requested services to the computing devices 102 and 104 over the network 108. The requests received from the users 110 and 112 through the respective computing devices 102 and 104 may be user queries. The knowledge system 114 may enable a foundation model to accurately retrieve information, thereby generating accurate responses for responding to queries by the users 110 and 112. The interaction between the knowledge system 114 and users 110, 112 may be conversational in nature, including conversational queries as well as conversational responses to the queries.

According to implementations of the present disclosure, the knowledge system 114 may be adapted for generating extended chunks by combining chunks being substantially relevant to the query with neighboring semantically similar chunks. Numerous examples depicting the generation of extended chunks, and thereby retrieving information based on the extended chunks are described in detail in conjunctions with figures below.

Figure 2:
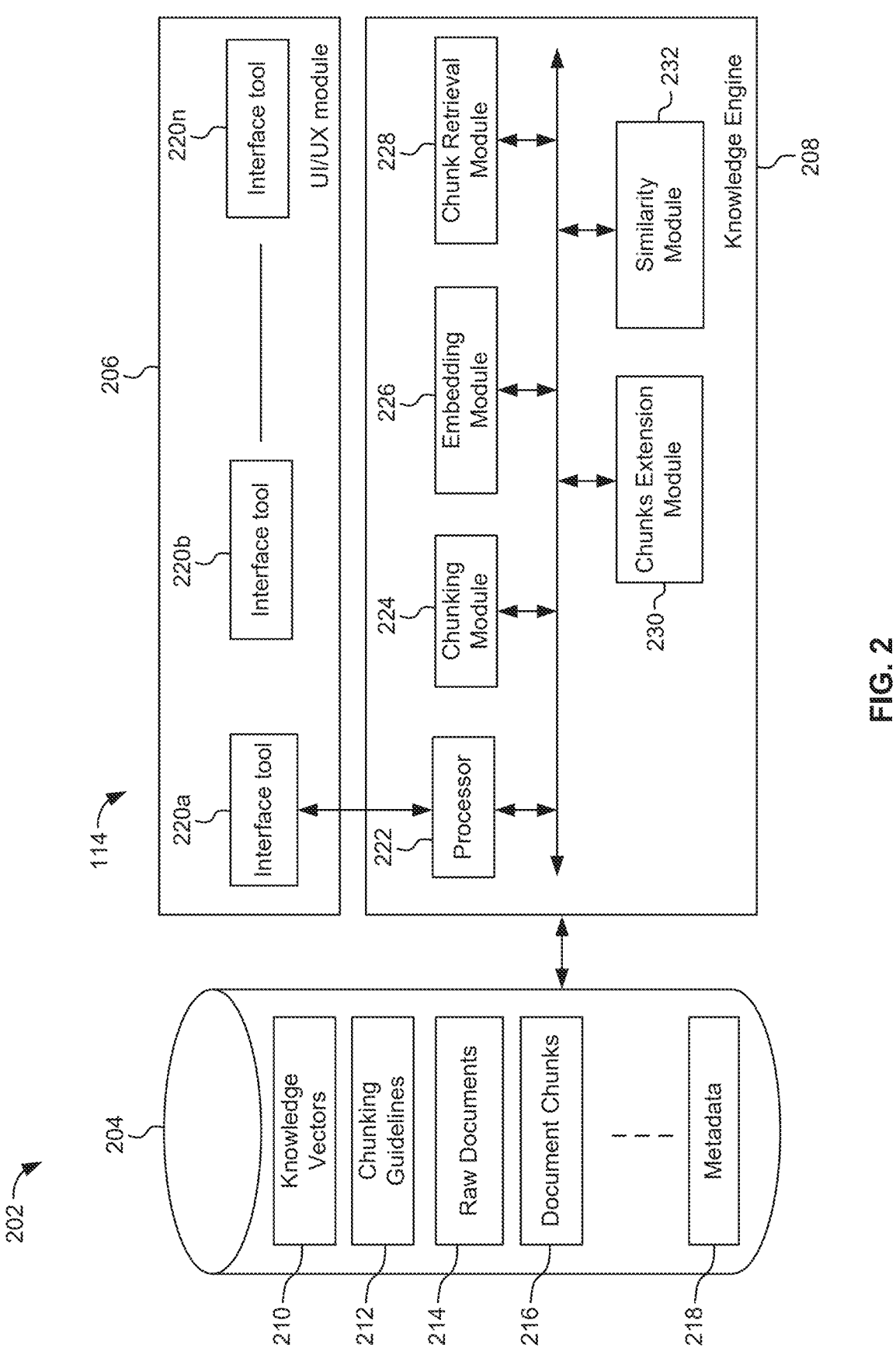
FIG. 2 depicts an example architecture of a knowledge system for generating extended chunks and retrieving knowledge utilizing the extended chunks in accordance with implementations of the present disclosure.

FIG. 2 depicts an example architecture 202 of the knowledge system 114 for generating extended chunks and utilizing the extended chunks for knowledge retrieval in accordance with implementations of the present disclosure. In an example, as depicted in FIG. 2, the knowledge system 114 receives one or more queries and generates content/responses such as, but are not limited to, text, images, audio, video, and/or the like, for the queries. The queries may include prompts for retrieving knowledge, for example, information pertaining to the world or specific systems. The responses may include additional information, feedback/inputs, and/or the like required for answering the query.

The knowledge system 114 includes a knowledge base 204, a User Interface (UI)/User Experience (UX) module 206, and a knowledge engine 208. The knowledge base 204 may be described as a structured repository or database associated with the knowledge system 114. The knowledge base 204 may incorporate various knowledge representation schemes, such as ontologies, taxonomies, or semantic networks, to encode and organize information in a machine-understandable format, thereby enabling advanced search, inference, and reasoning capabilities. Furthermore, the knowledge base 204 may leverage advanced technologies, including natural language processing, machine learning, and knowledge engineering techniques, to enhance knowledge acquisition, update, and refinement processes, ensuring its continual relevance and adaptability to evolving needs and circumstances.

In some implementations, the knowledge base 204 includes knowledge vectors 210, chunking guidelines 212, raw documents 214, document chunks 216, metadata 218, and additional information (not shown) pertaining to the knowledge system 114. The knowledge vectors 210 may be described as knowledge data being stored in form of vector representations, which facilitate efficient retrieval and utilization. The knowledge data may include structured information that encompasses data, facts, and insights derived from various data sources. Such structured information may be organized in a coherent manner to support decision-making, problem-solving, and system operations within the knowledge system 114. The chunking guidelines 212 may be described as guidelines pertaining to sequential steps and decision-making processes involved in generating chunks 216 from raw documents 214. The raw documents 214 refer to documents containing unprocessed collections of general or enterprise knowledge, without any analysis or interpretation applied.

The document chunks 216 segmented portions of information extracted from raw documents 214, typically structured for specific data analysis or processing purposes. Typically, document chunks 216 may have a specified size. However, with respect to the present disclosure, the document chunks 216 are implemented with dynamic sizing, where the size of each document chunk is adjusted dynamically based on intelligence of context of each chunk. For example, if the raw documents 214 contain text "Tides are primarily caused by the gravitational forces of the Moon and the Sun acting on the Earth's oceans. The Moon's gravitational pull is stronger than the Sun's, but both contribute to the rise and fall of sea levels around the globe" is split into two chunks, with chunk 'A' having "Tides are primarily caused by the gravitational forces of the Moon and the Sun acting on the Earth's oceans." and chunk 'B' having "The Moon's gravitational pull is stronger than the Sun's, but both contribute to the rise and fall of sea levels around the globe". Here, the size of each chunk has dynamically varied based on the intelligence of context since a mid-sentence break would not have any intelligent context.

The metadata 218 may be described as descriptive information pertaining to the data including, chunking guidelines 212, raw documents 214, and document chunks 216 stored within the knowledge base 204. Additionally, each chunk may store portions of metadata 218 pertaining to a previous and a next chunk, thereby increasing context and improving accuracy for knowledge retrieval.

The UI/UX module 206 may be defined as a module, which designs and manages a user interface (UI), via which the user interacts with the knowledge system 114, and the user's experience (UX) during said interaction. The UI/UX module 206 may integrate various technologies and frameworks to optimize visual layout, interactive elements, and overall usability, often utilizing principles of human-computer interaction (HCI) and graphic design.

In some examples, the UI/UX module 206 may represent one or more front-end components/interfaces 220a-220n of a chatbot that may be executed on one or more of the computing devices 102 and 104 to enable receipt of the conversational queries and providing one or more response to the conversational queries. In some examples, the query may be received through various modalities including, but not limited to, a question input to a chat bot, a request provided through a Graphical User Interface (GUI), an email, and/or the like.

The knowledge engine 208 may be configured for processing the queries received through the UI/UX module 206 using one or more foundation models. The foundation models may be described as a general-purpose Generative Artificial Intelligence (GAI) model like large deep learning neural network. The large deep learning neural network may be trained using broad range of generalized, unlabeled training data and that may perform a multitude of general tasks. Examples of the tasks may include generating text, generating images, conversing in natural language, generating video, generating audio, and/or the like. In some examples, the applications may be built on top of the foundation models. In some examples, multiple foundation models may be used to perform a range of functionality for an application.

The foundation models may include, for example, Large Language Models (LLMs), which are a form of GAI that may be used to generate text for a variety of use cases. In some examples, the LLMs may be integrated in digital assistants (for example: chatbots), replacing traditional rule-based systems to provide textual responses to a user input. A LLM may be described as an advanced type of language model that is trained using deep learning techniques on massive amounts of text data. The text data is general and not specific to any particular domain. The LLMs may generate human-like text and perform various Natural Language Processing (NLP) tasks (for example, translation, question-answering, and/or the like). In some examples, the LLM refers to models that use deep learning techniques and have a plurality of parameters, which may range from millions to billions. The LLMs may capture complex patterns in language and produce text that is often indistinguishable from that written by humans. The produced text may be processed through a deep learning architecture such as, recurrent neural network (RNN), a transformer model, and/or the like.

While implementations of the present disclosure are described in further detail with non-limiting reference to the LLMs as the example foundation models, it is contemplated that implementations of the present disclosure may be realized using any appropriate foundation models or Machine Learning (ML) models, or Artificial Intelligence (AI) models. Such models may generate the content/response based on any appropriate modality (for example, text, audio, image, video, and/or the like). In some examples, the response may correspond to the one or more task being represented by the conversational queries.

In some examples, the foundation models may be provided by one or more third parties. In some examples, the foundation models may be provided by the knowledge system 114. The foundation model receives requests/queries and provide responses to the queries. For example, questions/information requests may be received as queries through an Application Programming Interface (API).

The knowledge engine 208 includes one or more processors 222, a chunking module 224, an embedding module

226, a chunk retrieval module 228, a chunk extension model 230, and a similarity module 232.

The processor 222 may include, for example, microprocessors, microcomputers, microcontrollers, digital signal processors, central processing units, state machines, logic circuits, and/or any devices that manipulate data or signals based on operational instructions. Among other capabilities, the processor 222 may fetch and execute computer-readable instructions in a memory operationally coupled with the knowledge system 114 for generating the extended chunks.

The chunking module 224 generates the document chunks 216 from the raw documents 214. The document chunks 216 are segmented portions of the raw documents 214, aimed at extracting specific content relevant to the analysis or processing task at hand. The chunking module 224 parses and segments context of the raw documents 214 into manageable units, ensuring that each chunk retains meaningful context and information necessary for subsequent stages of data processing or analysis. The chunking module 224 may utilize one or more chunking techniques for generating the document chunks 216. In some instances, the chunking module 224 utilizes dynamic chunking techniques. Dynamic chunking techniques may adaptively adjust the size and content of the document chunks 216 based on contextual factors such as document length, content complexity, or relevance to the query, enhancing the efficiency and effectiveness of information retrieval and analysis workflows.

In some instances, the chunking module 224 may chunk the raw documents 214 into sizes smaller than an end-required size. Since the document chunks 216 are extended to hold greater information, and therefore context, initially chunking to a smaller size advantageously improves an accuracy and saves computational time. For example, if a final (required) chunk size is ~1000 words, and if the chunking module 224 initially generates ~1000 words chunks itself, after extending the chunks, the size may greatly increase to ~3000-5000 words. This would be too long and may lead to operational inefficiencies, including lagging. Hence, the chunking module 224 may chunk the raw documents 214 to an approximate size of 200-300 words, such that after extension the approximate size does not exceed 1000 words.

Additionally, some portions of the raw documents 214 may have smaller chunks, while others may have larger chunks depending on the context relevancy size. For example, some chunks may have a size of 50 words, while others may have a size of 250 words. Since the chunking performed by the chunking module 224 is dynamic, sizes of each chunk may vary based on individual context of the portion. For example, if the raw documents 214 is split into two chunks, with chunk 'A' having "Tides are primarily caused by the gravitational forces of the Moon and the Sun acting on the Earth's oceans, though the moon's gravitational pull is stronger than the sun's gravitational pull on the oceans around the globe." may have a size of 27 words and chunk 'B' having "The Moon's gravitational pull contribute to the rise and fall of sea levels" may have a size of 13 words. Here, the size of each chunk has dynamically varied based on the intelligence of context since a mid-sentence break would not have any intelligent context.

The embedding module 226 transforms the document chunks 216, and the queries (also be referred to as high-dimensional input data), such as words or tokens from text corpora, into lower-dimensional vector representations known as embeddings, in an embedding space. These embeddings encode semantic information about the input data, facilitating the capture of relationships and similarities between words or tokens. The embedding module 226 employs various techniques, including Word Embeddings (such as Word2Vec, GloVe) and contextual embeddings (like ELMo, BERT) for generating dense numerical representations of words based on their contextual usage. These embeddings serve as compact and informative representations suitable for downstream machine learning tasks, such as text classification, sentiment analysis, and language modeling.

In some instances, the embedding module 226 may be implemented with respect to Retrieval-Augmented Generation (RAG). Within the RAG framework, the embedding module 226 is utilized in both the retrieval and generation processes. The embedding module 226 may advantageously enable efficient information retrieval by representing the document chunks 216, and the queries, while also guiding the generation of coherent responses by encoding contextual information.

In other instances, the embedding module 226 may be implemented with respect to a Knowledge Graph (KG). Within the KG framework, the embedding module 226 serves a dual role in both querying and generating information. The embedding module 226 may facilitate effective information retrieval by encoding the document chunks 216, and the queries within the knowledge graph, while also enhancing the coherence of generated responses through contextual encoding.

On receiving a user query, the chunk retrieval module 228 initiates the process of the present disclosure. The chunk retrieval module 228 refers to a component configured to retrieve relevant document chunks 216 from the embedding space. The chunk retrieval module 228 retrieves the document chunks 216 by embedding the user query into the embedding space and identifying chunks which are semantically similar to the query, facilitating efficient similarity computation between the query representation and pre-computed document chunk embeddings. Advantageously, this identifies and retrieves document chunks 216 that best match the semantic context and information needs expressed in the user query, ensuring precise and relevant results for subsequent stages of analysis or generation.

Thereafter, the chunk extension module 230 generates context-aware chunks by extending toward each semantically similar document chunk. The chunk extension module 230 refers to a component configured to enhance the context and scope of retrieved document chunks 216. The chunk extension module 230 extends the chunks by iteratively expanding the boundaries or content of each identified chunk towards semantically related chunks within the embedding space. Advantageously, this leverages semantic relationships encoded in the embeddings to augment the informational context of each chunk, thereby enriching the overall depth and relevance of the retrieved content for subsequent analytical or generative tasks.

For example, if the query is implemented as "What causes tides in the ocean?," and the identified document chunk 216 includes text "Tides are primarily caused by the gravitational forces of the Moon and the Sun acting on the Earth's oceans. The Moon's gravitational pull is stronger than the Sun's, but both contribute to the rise and fall of sea levels around the globe", the chunk extension module 230 extends the document chunk 216 toward the semantically similar document chunk, which may contain text "when the Moon is directly overhead, its gravity pulls the water towards it, creating a high tide. Conversely, when the Moon is on the opposite side of the Earth, its gravity pulls water away from the coastline, resulting in a low tide." In such, the size of the chunk is increased from an original 42 words to 84 words. Here, the semantically similar document chunk may not have been initially considered as context in a typical process, but due to the extension of chunks performed by the chunk extension module 230, the knowledge system 114 provides accurate and appropriate responses due to an increased level of relevant context.

The similarity module 232 refers to a component configured to identify similar chunks in the embedding space. The similarity module 232 may be utilized to identify chunks which are semantically similar to the query, identify contextually similar chunks during extension of the chunks, and/or identify context-aware chunks which are relevant for the query. The similarity module 232 utilizes one or more similarity techniques for identifying similar chunks. Examples of the similarity techniques may include k nearest neighbor technique, cosine similarity technique, clustering techniques, and the like, to robustly identify and rank similar chunks based on their semantic proximity within the embedding space.

Figure 3:
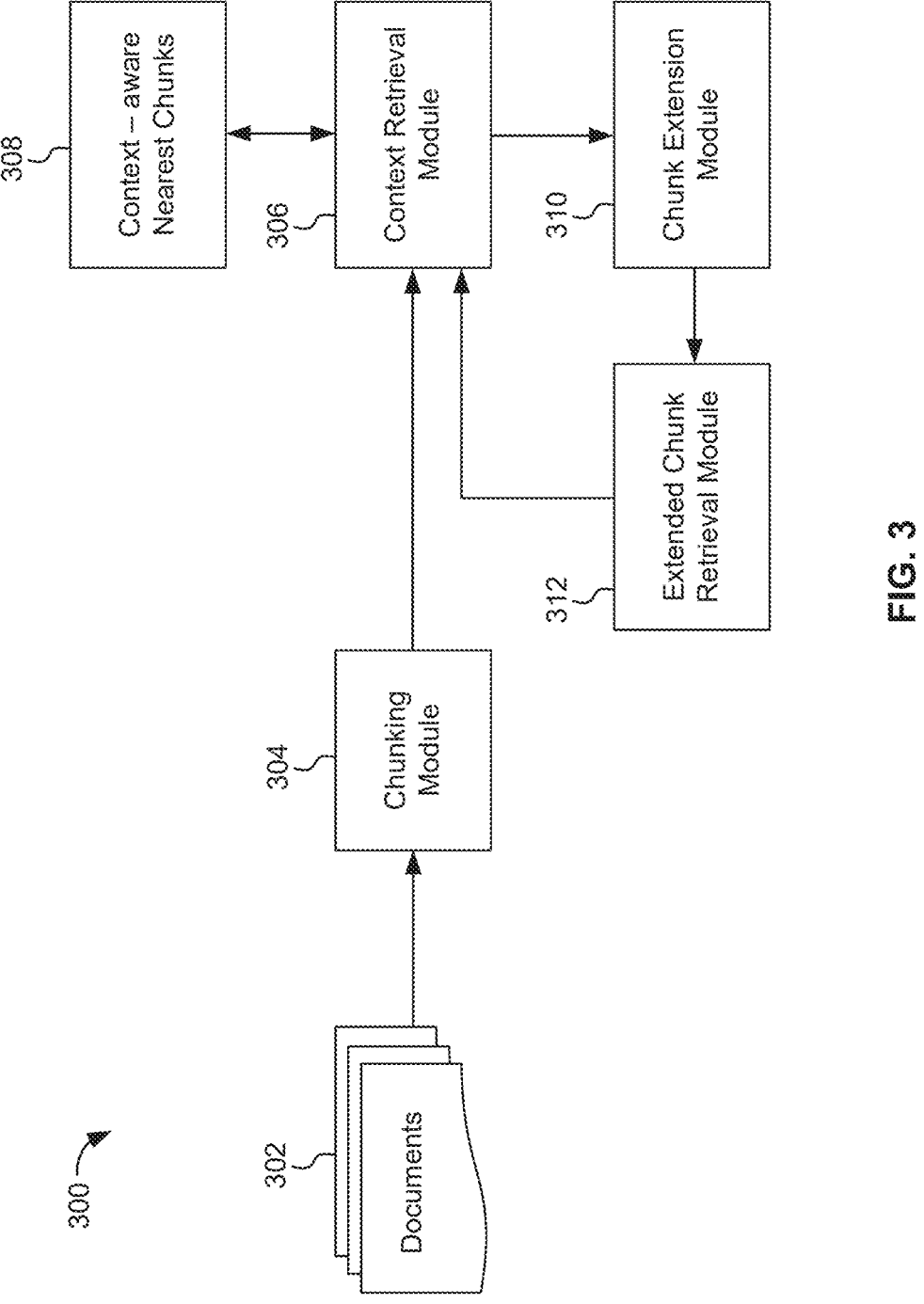
FIG. 3 depicts a block diagram showing a process flow of retrieving knowledge utilizing extended chunks in accordance with implementations of the present disclosure.

FIG. 3 depicts a block diagram 300 showing a process flow of retrieving knowledge utilizing extended chunks in accordance with implementations of the present disclosure.

As shown in FIG. 3, documents 302 are inputted into the chunking module 304/224. The documents 302 may be the raw documents 214. The chunking module 304/224 generates document chunks 216 by dividing the documents 302 into multiple small portions of knowledge. Hence, the chunks may include a sentence, a portion of sentence, a paragraph, one or more paragraphs, etc. In some instances, the document chunks 216 may be embedded into the embedding space as vector representations by the embedding module 226.

On receiving the user query, the embedding module 226 embeds the query into the embedding space. Thereafter, the context retrieval module 306 identifies k nearest chunks which are semantically similar to the query, by retrieving and analyzing the context of each chunk. The context retrieval module 306 refers to a component configured to retrieve and analyze the contextual information of document chunks 216 in the embedding space. The context retrieval module 306 utilizes semantic similarity metrics to identify and select the k nearest chunks that closely align with the semantic context of the user query, thereby optimizing information retrieval processes for enhanced accuracy and relevance.

Once the k nearest chunks have been identified, the chunk extension module 310/230 extends the k nearest chunks to neighboring semantically similar chunks. Thereafter, the chunk extension module 310/230 generates the extended chunks by combining the k nearest chunks with the neighboring semantically similar chunks, and shares information pertaining to the extended chunks to an extended chunk retrieval module 312.

The extended chunk retrieval module 312 refers to a component configured to retrieve the extended chunks (i.e., information pertaining to the extended chunks) from the embedding space. The extended chunk retrieval module 312 provides the extended chunk information to the context retrieval module 306, such that the context retrieval module 306 retrieves the context from the extended chunks to generate context-aware nearest chunks 308. The context aware nearest chunks 308 entail information which is contextually relevant to the query. When the context aware nearest chunks 308 are provided to the foundation model, the foundation model has more contextual information pertaining to the query, improving an accuracy of the response provided by the foundation model.

Figure 4:
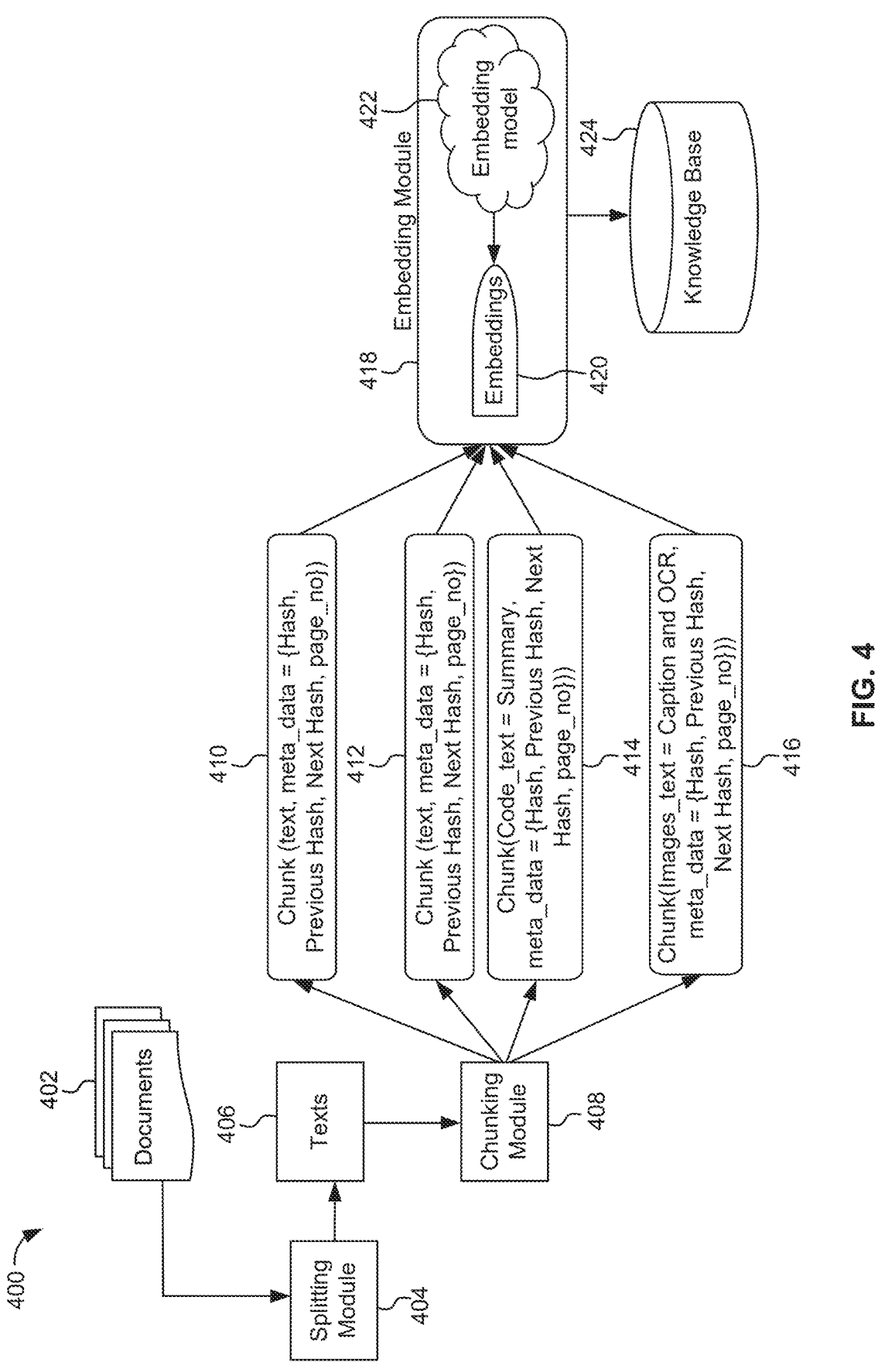
FIG. 4 depicts a block diagram showing a process flow of embedding chunks into an embedding space in accordance with implementations of the present disclosure.

FIG. 4 depicts a block diagram 400 showing a process flow of embedding chunks into an embedding space in accordance with implementations of the present disclosure.

As shown in FIG. 4, documents 402/302 are inputted into a splitting module 404. The documents 402/302 may be the raw documents 214. The splitting module 404 may refer to a component configured to divide or split the raw documents 214 or the documents 402/302 into snippets of text 406, which can be converted into knowledge chunks. The knowledge chunks may also be referred to as the document chunks 216. Once the splitting module 404 splits the documents 402/302 into texts 406, the texts 406 are provided to the chunking module 408/304/224.

The chunking module 408/304/224 generates chunks 410, 412, 414, and 416 by converting continuous text inputs 406 into segmented chunks 410, 412, 414, and 416, each containing coherent and contextually relevant information. This advantageously enables finer-grained analysis and retrieval of textual data, ensuring that each chunk 410, 412, 414, and 416 encapsulates essential semantic details necessary for downstream processing tasks.

The chunks 410, 412, 414, and 416 may include metadata from a previous and a next chunk, based on contextual similarity and correlation in the documents 402/302. Metadata refers to additional information or descriptive data that provides context or insights into the main content of the chunks 410, 412, 414, and 416. In the context of chunking within information retrieval systems, metadata can include several types of auxiliary information that enriches the understanding and utility of the chunked data. In an example, the metadata may include timestamps, author information, document identifiers, and the like.

This metadata may be implemented as hashes. Hashes refer to cryptographic fingerprints that uniquely identify and verify the integrity of each chunk. In the context of chunked text or document processing, hashes are used to represent the content of each chunk 410, 412, 414, and 416 in a compact and unique manner. These hashes serve as digital fingerprints or checksums, allowing for efficient comparison and verification of chunk integrity. Storing hashes of previous and next chunks within each chunk's metadata advantageously ensures data coherence and enables quick verification of chunk relationships during retrieval and analysis processes.

In an example, consider data collected about tidal patterns: a first chunk 410 might include information about tidal movements over a specific time period, while a second chunk 412 may detail meteorological conditions affecting tidal behavior. Metadata stored in the first chunk 410 may include geographic coordinates and timestamps, providing context and temporal relevance. The second chunk's 412 metadata may contain sensor calibration details and environmental factors recorded during data acquisition, enhancing data accuracy and interpretation. Cryptographic hashes computed from each chunk's content serve as unique identifiers, facilitating rapid verification of data integrity and enabling reliable linkage between chunks, even within complex datasets like tidal patterns stored in embedded spaces.

The chunks 410, 412, 414, and 416 may be provided to the embedding module 418/226. The embedding module 418/226 embeds the chunks 410, 412, 414, and 416 into the embedding space. The chunks 410, 412, 414 and 416 are embedded into the embedding space based on individual context, wherein the embedding space may be represented with sections directed to different contexts. In an example, when two chunk embeddings are near each other in the embedding space, both chunk embeddings may have a similar context, and may be semantically similar to each other.

The embedding module 418/226 includes an embedding model 422 and embeddings 420. The embedding model 422 refers to a foundation model which is configured to dynamically change the embeddings 420 with respect to the context of the query. Additionally, the embedding module 418/226 may employ the embedding model 422 to embed the chunks 410, 412, 414, and 416 into the embedding space. The embeddings 420 may refer to dense representations that capture semantic information from the chunks 410, 412, 414, and 416. The embeddings 420 facilitate efficient information retrieval and analysis processes, leveraging their contextual relevance and relationships within the embedding space to enhance performance.

The embedding module 418/226 may be communicably coupled to the knowledge base 424/204. In this regard, the embedding module 418/226 may share data pertaining to the embedding space and the embeddings 420 to the knowledge base 424 for storage. Distinct types of data stored at the knowledge base 424/204 has been discussed above with respect to FIG. 2.

It will be appreciated that the splitting module 404, the chunking module 408/304/224, the embedding module 418/226, and the knowledge base 424/204 are components of the knowledge system 114. Therefore, actions performed by each of these components are in operation performed by the knowledge system 114, via the processor 222.

FIG. 5 depicts a graphical representation 500A, 500B, 500C, 500D, 500E, and 500F of an embedding space having embeddings for chunks and queries in accordance with implementations of the present disclosure.

The graphical representations 500A, 500B, 500C, 500D, 500E, and 500F depict various stages of implementation of the present disclosure. Therefore, the implementation of the present disclosure is explained in accordance with these figures. Notably, the knowledge system 114 performs actions, via the processor 222, to execute embodiments of the present disclosure.

Figures 5A, 5B:
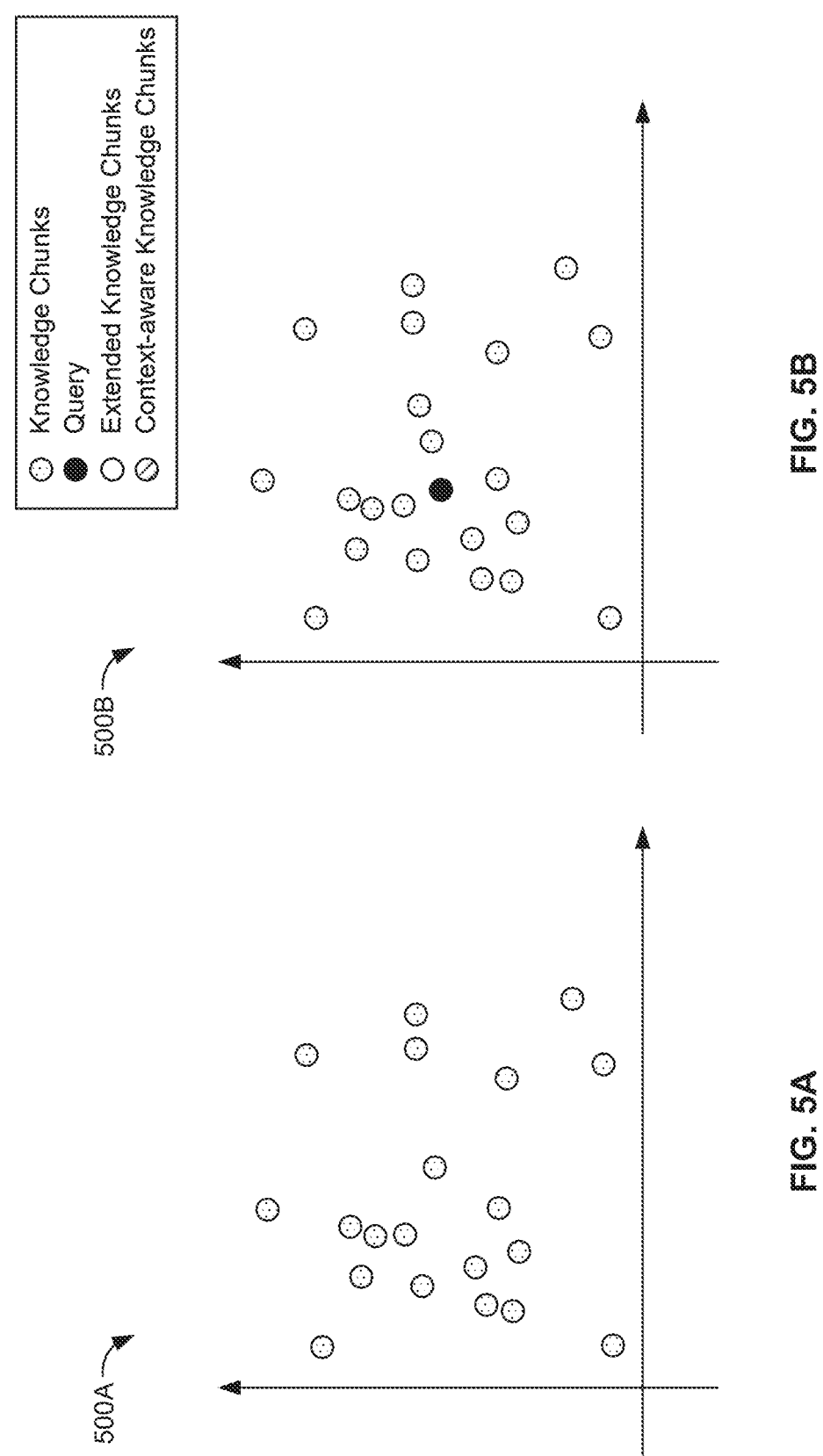

FIG. 5A depicts the graphical representation 500A of the embedding space having embeddings for knowledge chunks in accordance with implementations of the present disclosure.

The knowledge system 114 may access the chunks 410, 412, 414, and 416 embedded in the embedding space from the knowledge base 424/204. As shown in FIG. 5A, the chunks (i.e., knowledge chunks) are represented with dotted circles. The embedding space may be represented in a plurality of dimensions (for example, even up to hundreds or thousands of dimensions). In some cases, the embedding space is represented in two dimensions for enabling visualization, such that distance between two embedding vectors may be assessed based on visual representations of the embedding vectors itself. Entities that are closer within the embedding space may be more semantically similar or share common attributes.

FIG. 5B depicts the graphical representation 500B of the embedding space having embeddings for knowledge chunks and the query in accordance with implementations of the present disclosure.

Based on conversations with the user, the knowledge system 114 may receive the query. The query from the user may be pertaining to a question or request for information from a database, for example. The knowledge system 114 may generate a query chunk and embed the query chunk into the embedding space. As shown in FIG. 5B, the query chunk (i.e., query) is represented with a solid fill circle. Since the embedding space is represented with respect to semantic similarity and relationships, the knowledge system 114 may embed the query at a suitable location, based on a context of the query.

Figures 5C, 5D:
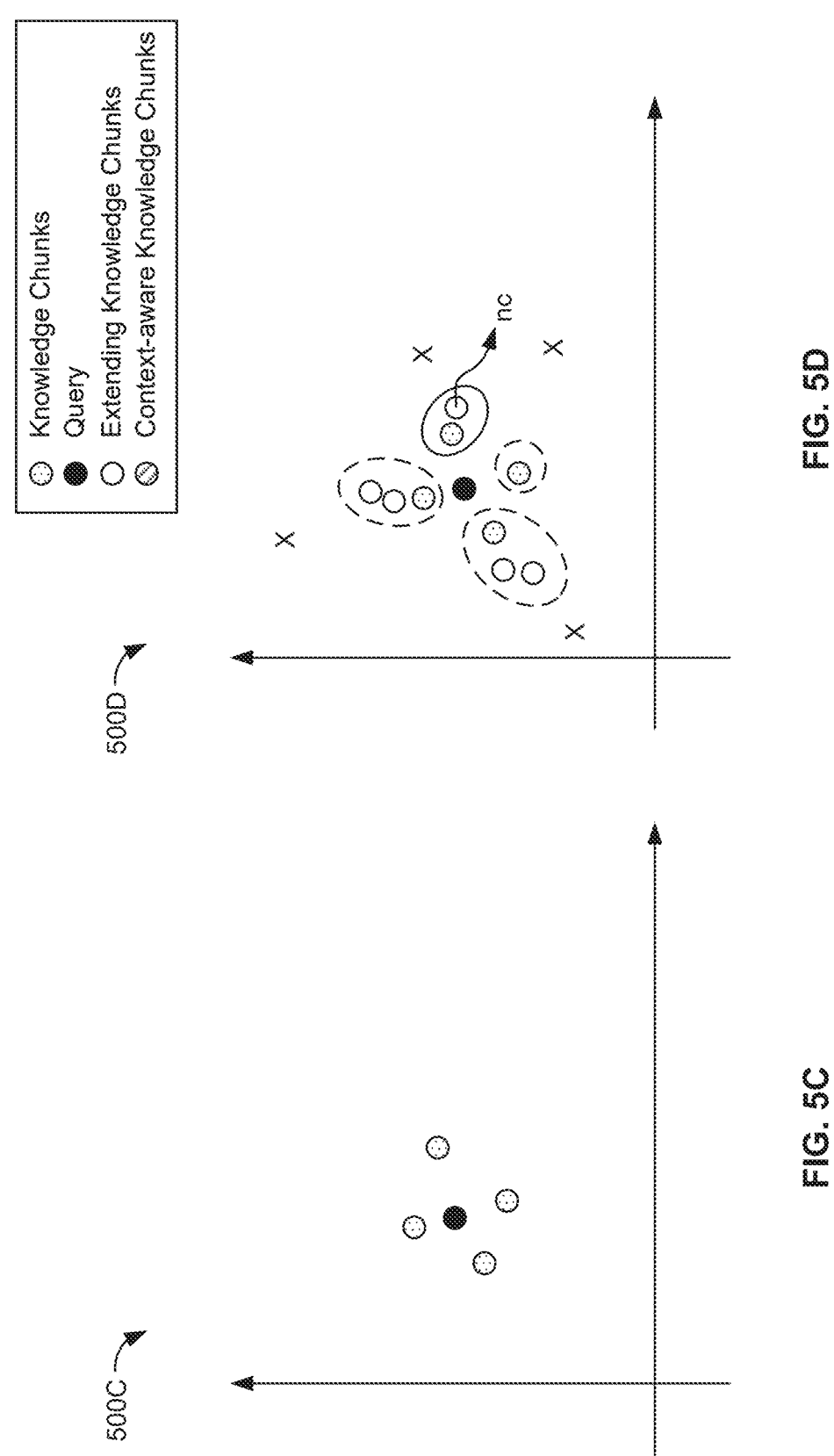

FIG. 5C depicts the graphical representation 500C of the embedding space having embeddings for the query and the top k relevant chunks in accordance with implementations of the present disclosure.

The knowledge system 114 identifies the top k relevant chunks by mapping a semantic similarity of the chunks with the query chunk. In this regard, the knowledge system 114 determines an order of similarity of the chunks to the query. The order may refer to a prioritization of the chunks based on contextual and semantic similarity with the query. For example, when the first chunk pertains to "gravitational forces of sun and moon cause tides" and the second chunk "moon's gravitational pull is stronger than the sun's," both chunks are contextually relevant to the query "what causes tides in ocean." Therefore, the order may be "first chunk, then second chunk" since the first chunk is comparatively more similar to the query than the second chunk 412. Hence, on receiving the query from the user, the knowledge system 114 identifies a plurality of chunks (k relevant chunks) substantially relevant to the query, the plurality of chunks containing information relevant to the query.

Based on the order, the knowledge system 114 select the top k relevant chunks being substantially similar to the query as the chunks having substantial relevance to the query. The terms 'substantially similar' or 'substantial similarity' pertain to the order of similarity, where chunks having more similarity with the query are prioritized in the order over chunks having lesser similarity with the query. It will be appreciated that 'k' is a natural number. In some instances, 'k' may be selected to be greater than a final number of chunks to be shared with the foundation model as context. For example, if the final number of chunks to be shared with the foundation model is five (5), k may be selected as ten (10).

In some instances, the top k relevant chunks may be determined using a k nearest neighbor technique. The k-Nearest Neighbors (k-NN) technique is a simple, supervised learning technique used for classification and regression. It works by finding the 'k' closest data points to a given input and predicting an output based on the majority class or average value of these neighbors.

In some instances, the top k relevant chunks may be determined based on a predefined threshold. In these instances, the predefined threshold may be lower than the final number of chunks to be shared with the foundation model. The predefined threshold refers to a predefined criterion for filtering and selecting chunks from the embedding space based on their relevance to the query or task at hand. This criterion ensures that only most pertinent chunks, meeting specified criteria of relevance or significance, are considered for further processing or analysis within the system.

Some example techniques which utilize the predefined threshold to determine the top k relevant chunks may include a Term Frequency-Inverse Document Frequency (TF-IDF) technique, a cosine similarity technique, a Best Matching 25 (BM25) technique, a Jaccard similarity technique, a PageRank technique, and the like. These techniques assess the relevance of chunks based on various criteria such as term frequency, document structure, similarity metrics, or graph-based connectivity, ensuring the selection of most pertinent chunks for further processing or analysis. For example, if the final number of chunks to be shared with the foundation model is five (5), the predefined threshold may be selected as eight (8).

In some instances, the predefined threshold is implemented as a score rather than a number of items. For example, when utilizing the TF-IDF technique, or the cosine similarity technique, the predefined threshold may be represented as a similarity score from 0-100%, where 100% refers to an exact match, and 0% refers to 'no similarity'.

FIG. 5D depicts the graphical representation 500D of the embedding space having embeddings for the query and showing the extension of chunks in accordance with implementations of the present disclosure.

Upon identifying the plurality of chunks (the top k chunks) that are sustainably relevant to the query, the knowledge system 114 identifies one or more semantically similar chunks for one or more of the plurality of chunks. Once the top k chunks are identified, the knowledge system 114 extends the top k chunks to generate context-aware chunks. In this regard, the knowledge system 114 iteratively selects neighboring chunks of the top k relevant chunks that are within a predetermined similarity distance to the top k relevant chunks as the neighboring semantically similar chunks. The neighboring chunks may also be referred to as 'extending chunks,' since these chunks are identified in the process of extending the top k chunks. As shown in FIG. 5D, the extending chunks are represented with a hollow circle.

Notably, distance between nodes, for example, the predetermined similarity distance between the neighboring chunks and the top k relevant chunks, is computed through various techniques and methodologies aimed at assessing semantic or conceptual similarity, or even physical proximity. Exemplary techniques or methodologies for measuring distance between nodes in the knowledge graph include cosine similarity, weighted graph distance computations, embedding approaches, semantic similarity metrics, machine learning methodologies, Natural Language Processing (NLP) techniques, and statistical methods. Cosine similarity is a measure used to determine how similar two chunks of text (or other data) are in terms of their orientation in a multi-dimensional space. When identifying the top k chunks based on cosine similarity, the cosine of the angle between the vectors representing the chunks is calculated, prioritizing chunks that are closest in direction (or orientation) to the reference chunk. Weighted graph distance computations integrate attribute relevance into distance calculations, providing a nuanced measure that considers the weighted importance of node attributes.

Embedding approaches transform nodes into vector spaces where distance metrics like cosine similarity quantify the semantic or conceptual similarity between nodes based on their embeddings. Semantic similarity metrics utilize feature-based comparisons and ontology-driven measures that leverage domain-specific knowledge to evaluate shared attributes or relationships between nodes comprehensively. Machine learning methodologies, encompassing both supervised and unsupervised techniques, facilitate the training of models to predict relational structures or cluster entities based on inherent properties extracted from the graph. NLP techniques, such as word embeddings and semantic textual similarity, enhance similarity measurement by mapping entities to vectors and assessing textual descriptions or contextual relevance. Statistical methods utilize probabilistic models to estimate likelihoods of relationships or similarity based on data-driven inference. Together, these methodologies establish the unit of distance in a knowledge graph as a measure of conceptual or semantic proximity rather than physical distance.

The predefined similarity distance refers to a predefined range of distance between the top k chunks and the extending chunks. In some instances, the knowledge system 114 iteratively selects the neighboring (i.e., extending) chunks in a given direction, for example, towards a closest neighboring chunk. Here, 'iteratively' refers to selecting the neighboring chunks one after another, possibly in a sequence. For the purposes of the present disclosure, 'neighboring chunk' refers to a prior chunk and a next chunk, having proximity to the top k chunks.

The neighboring semantically similar chunks (i.e., extending chunks) of the top k relevant chunks occur sequentially, that is, in a sequence, with the relevant chunk. As shown in the figure, the knowledge system 114 keeps selecting the extending chunks based on contextual similarity, one after the other, for each top k chunk. Additionally, the neighboring semantically similar chunks of at least one of the top k relevant chunks occur sequentially with the relevant chunk in a source document. The source document refers to a document pertaining to the enterprise, from where the plurality of chunks are extracted.

Further, the knowledge system 114 identifies the subset of the corresponding neighboring chunks that are within a predetermined similarity distance to the top k relevant chunks using at least one similarity technique. The similarity technique may be implemented as one of cosine similarity, Euclidean similarity, Jaccard similarity, Pearson Correlation Coefficient.

Additionally, the knowledge system 114 accesses the metadata of the top k relevant chunks, wherein the metadata of a relevant chunk of the top k relevant chunks includes the hash value of the relevant chunk, and the hash value of a previous chunk, in a sequence of chunks including the relevant chunk and the hash value of a subsequent chunk of the relevant chunk in the sequence of chunks. Implementations of the metadata and the hashes are discussed in detail above with reference to FIG. 4.

Thereafter, the knowledge system 114 ceases or stops the iterative selection when one of the neighboring chunks fails to fall or does not fall within the predetermined similarity distance. For example, the knowledge system 114 ceases the iterative selection when the system fails to identify any further semantically similar chunk to a top k relevant chunk. The chunks that fail to fall within the predetermined similarity distance are represented with 'X' in FIG. 5D. Once the chunk that fails to fall within the predetermined similarity distance is reached, the knowledge system 114 stops iteratively traversing the embedding space. Therefore, the extending chunks identified so far are utilized to generate the extended chunks (i.e., the context-aware chunks).

In some instances, the knowledge system 114 ceases or stops the iterative selection based on a predefined maximum chunk size. The predefined maximum chunk size may be predefined by the user. For example, if the predefined maximum chunk size is 5000, the knowledge system 114 may stop the iterative extension once the extended chunk size approaches 5000 (i.e., the maximum limit).

Figures 5E, 5F:
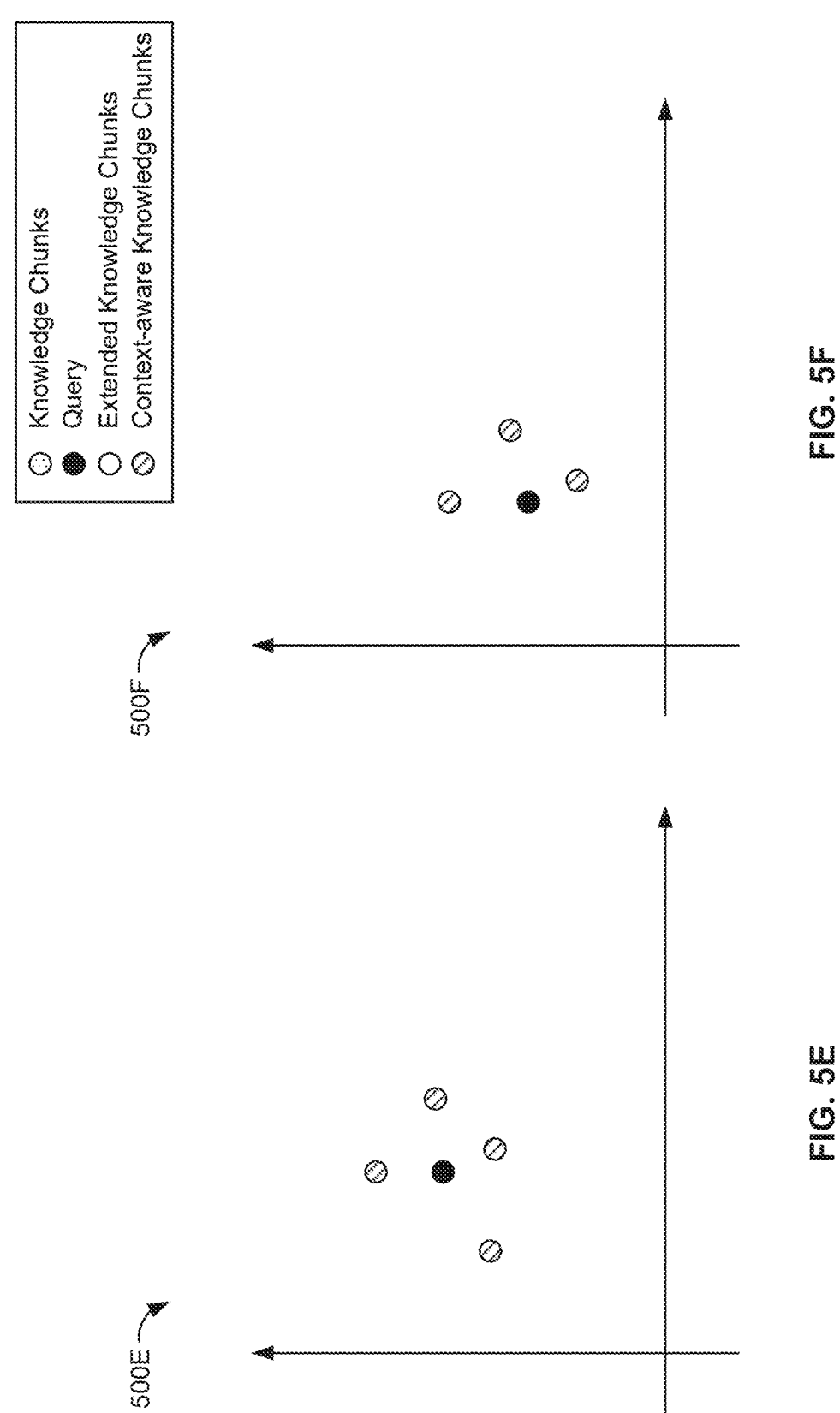

FIG. 5E depicts the graphical representation 500E of the embedding space having embeddings for the query and extended chunks in accordance with implementations of the present disclosure.

The knowledge system 114 generates extended chunks by combining the one or more semantically similar chunks with the respective one or more of the plurality of chunks being substantially relevant to the query. That is, for each of the plurality of chunks which are substantially relevant to the query, the system identifies one or more semantically similar chunks and then the system combines the one or more semantically similar chunks with the respective chunk which is substantially relevant to the query. Referring to FIG. 5D, the dotted circles near to the solid fill circle (query) represents the top k chunk (the plurality of substantially similar chunks to the query) and the hollow circles near to the dotted circles represents the semantically similar neighboring chunks. Now referring to FIGS. 5D and 5E, the semantically similar neighboring chunks associated with a top k chunk are combined with the respective top k chunk to form the extended chunk (which is represented by striped circle) which are the context aware knowledge chunk. The context aware knowledge chunk is also referred to as the context aware chunk or the context aware extended chunk.

Therefore, the knowledge system 114 generates the context-aware chunks by combining the extending chunks with the top k chunks. Each top k chunk may be combined with relevant extending chunks for generating individual context-aware chunks. As shown in FIG. 5E, the context-aware chunks are represented with striped circles.

In this regard, the knowledge system 114 may append text of the extending chunks to that of the corresponding top k chunks. Appending may refer to concatenating or adding the textual content of the extending chunks with the text of the top k chunks, ensuring comprehensive coverage of relevant information. Since chunks have a maximum size threshold, for example, 1000, the knowledge system 114 may intelligently append the text of the extending chunks, appending only most pertinent contextually similar information, such that the maximum size threshold is not exceeded.

The maximum size threshold is predetermined based on a token limit of the foundation model. The token limit refers to a maximum number of tokens or words that the foundation model can process efficiently in one sequence. For instance, popular foundation models (for example, GPT-3) may have a token limit of 2048, while smaller models may have lower limits such as 512 tokens. This ensures that the concatenated text remains within the processing capabilities of the foundation model, optimizing performance and accuracy in generating responses based on the appended chunks.

Thereafter, the knowledge system 114 generates vector embeddings (as shown in the figure) of the context-aware chunks having the appended text, in the embedding space.

FIG. 5F depicts the graphical representation 500F of the embedding space having embeddings for the query and context-aware chunks in accordance with implementations of the present disclosure.

The knowledge system 114 selects a subset of the context-aware chunks based on one or more objectives. The objectives may pertain to a criterion or requirement, based on which the subset of context-aware chunks is selected. The multiple objectives include at least chunk sizes, entities, topics, and similarity scores. In this regard, the knowledge system 114 may select top m relevant context-aware chunks based on contextual and semantic similarity with the query. Notably, the top m relevant context-aware chunks are selected based on the k nearest neighbor technique. As shown in FIG. 5F, a context aware chunk (represented in the left bottom corner of the embedding space in FIG. 5D) is absent, since only the top k context aware chunks are considered. For example, m=3, which means that the top three context aware chunks were selected. Entities refer to discrete and identifiable elements essential to the structure, operation, or implementation described herein. These elements encompass physical components, software modules, algorithms, data structures, organizations, individuals, or legal entities. Each entity is defined by its specific role, function, and interaction within the framework described. Examples of entities include companies, personalities, and the like. Additionally, entities may be a subset of topics, such that each topic may include a plurality of entities.

Thereafter, the knowledge system 114 executes a multi-objective optimization process with the multiple objectives as process parameters. The multi-objective optimization refers to finding a set of solutions that optimally balance competing objectives. In this context, the objectives are typically distinct measures of performance, efficiency, or quality that need to be maximized or minimized simultaneously. The multi-objective optimization may be implemented using at least one optimization technique, including, a Non-dominated Sorting Genetic Algorithm II (NSGA II) technique, a Technique for Order of Preference by Similarity (TOPSIS), and the like.

By exploring various trade-offs between these objectives, the knowledge system 114 aims to identify a range of Pareto-optimal solutions. These solutions represent the best possible outcomes where no single objective can be improved without sacrificing the performance of another, thus providing decision-makers with a comprehensive set of options to choose from based on their priorities and constraints. An outcome of the multi-objective optimization is crucial in complex decision-making scenarios where achieving a balance among multiple conflicting goals is essential for achieving optimal results.

Since sizes of the chunks would vary based on individual context and information, the extended chunks may also be of varied sizes. The knowledge system 114 advantageously generates the document chunks 216 in a dynamic manner. The size of each chunk may depend upon a number of extending chunks appended, a volume of information appended, an initial size of the top k chunk, and the like.

Thereafter, the knowledge system 114 inputs the query and the selected subset as a context to the foundation model for retrieving information relevant to the query from the foundation model. The foundation model generates a response for the user, based on the query and the context. It will be appreciated that the foundation model is conversationally coupled with the user, such that the user provides queries and receives responses for the same from the foundation model in a conversational manner. The selected subset of the extended chunks may be the top k context aware chunks which are fed to the foundation model along with the query as the context. For example, the query 'what causes tides in the ocean,' along with the top k context aware chunks (three, as shown in FIG. 5F) are provided to the foundation model for retrieving information relevant to the query.

The foundation model may generate the response for the user, based on the query and the top k context aware chunks.

FIG. 6 is a flow diagram presenting an exemplary method 600 in accordance with implementations of the present disclosure. In some implementations, the method 600 may be executed within the knowledge system 114 as described in relation to FIG. 2.

At step 602, top k chunks are identified. The top k chunks as described herein refers to the plurality of chunks that are substantially relevant to a query, and the top k chunks are identified from an embeddings database. The embeddings database is communicably couples to the embedding module 418/226 and stores embeddings of chunked document text along with metadata of the chunks. Additionally, k may be a natural number. Embeddings and the embedding space are discussed in detail with reference to FIG. 4.

At step 604, one or more semantically similar chunks for one or more of the plurality of chunks (top k chunk) are identified. In one embodiment, for each of the plurality of chunks, neighboring chunks are identified using the metadata associated with the chunks. Then, the one or more neighboring chunks which are semantically similar to the chunk are identified, which forms the extended chunk.

At step 606, the one or more extended chunks are generated. The extended chunks are generated by combining the semantically similar chunks with the top k chunks, by the chunking module 408/304/224. The chunks being substantially relevant to the query with neighboring semantically similar chunks may be utilized for generating the extended chunks. Generation of the extended chunks is discussed in detail with reference to FIGS. 5D and 5E.

At step 608, a subset of the extended chunks is selected. The subset of the extended (context-aware) chunks is selected based on multiple objectives. The multiple objectives may include chunk sizes, entities, topics, and similarity scores. Selection of the subset of extended chunks is discussed in detail with reference to FIGS. 5E and 5F.

At step 610, the query, and the selected subset as are inputted into the foundation model as a context for retrieving a response to the query which response includes relevant information from the foundation model. The context may include the selected subset of the one or more extended chunks. Advantageously, the method 600 enables obtaining an accurate response in an efficient, and reliable manner with the context input to the foundation model including the extended chunks, thereby resulting in high accuracy.

FIG. 7 illustrates a computer system 700 that may be used to implement the knowledge system 114. More particularly, computing machines such as desktops, laptops, smartphones, tablets, and wearables which may be used to process the conversational interactions in the knowledge system 114 may have the structure of the computer system 700. The computer system 700 may include additional components not shown and that some of the process components described may be removed and/or modified. In another example, a computer system 700 may be deployed on external-cloud platforms such as cloud, internal corporate cloud computing clusters, organizational computing resources, and/or the like.

The computer system 700 includes processor(s) 702, such as a central processing unit, ASIC or another type of processing circuit, input/output devices 704, such as a display, mouse keyboard, etc., a network interface 706, such as a Local Area Network (LAN), a wireless 802.11x LAN, a 3G or 4G mobile WAN or a WiMax WAN, and a processor-readable medium 708. Each of these components may be operatively coupled to a bus 710. The computer-readable medium 708 may be any suitable medium that participates in providing instructions to the processor(s) 702 for execution. For example, the computer-readable medium 708 may be non-transitory or non-volatile medium, such as a magnetic disk or solid-state non-volatile memory or volatile medium such as RAM. The instructions or modules stored on the computer-readable medium 708 may include machine-readable instructions 712 executed by the processor(s) 702 that cause the processor(s) 702 to perform the methods and functions of the knowledge system 114.

The knowledge system 114 may be implemented as software stored on a non-transitory processor-readable medium and executed by the processors 702. For example, the computer-readable medium 708 may store an operating system 714, such as MAC OS, MS WINDOWS, UNIX, or LINUX, and code for the knowledge system 114. The operating system 714 may be multi-user, multiprocessing, multitasking, multithreading, real-time, and the like. For example, during runtime, the operating system 714 is running and the code for the knowledge system 114 is executed by the processor(s) 702.

The computer system 700 may include a data storage 716, which may include non-volatile data storage. The data storage 716 stores any data used or generated by the knowledge system 114.

The network interface 706 connects the computer system 700 to internal systems for example, via a LAN. Also, the network interface 706 may connect the computer system 700 to the Internet. For example, the computer system 700 may connect to web browsers and other external applications and systems via the network interface 706.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations of the present disclosure provide multiple technical improvements and address drawbacks of traditional information retrieval methods, which often require manual intervention. For example, implementations of the present disclosure provide accurate retrieval of information for responding to the user query. Such accuracy directly leads to improved performance of the foundation model. This accuracy leads to efficient, economic, and correct responses from the foundation model, drastically reducing chances of hallucinations.

Additionally, since the generated extended chunks are self-contained, coherent, and complete in sense of semantically similar data, the context that needs to be passed to the foundation model is lesser. Since only the essential and relevant context is being provided to the foundation model, the method and the system disclosed in the present disclosure reduces the computational time and hence cost involved in retrieving relevant information from the foundation model.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system 714, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media, and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:

at least one processor; and at least one non-transitory processor-readable medium storing instructions to be executed by the at least one processor to:

generate a series of segmented chunks from continuous text input of documents;

wherein the series chunks of segmented contain coherent information and each segmented chunk in the series of segmented chunks includes metadata descriptive of main content from a previous chunk and a next chunk in the series of segmented chunks;

identify from the series of segmented chunks, a plurality of chunks substantially relevant to a query, the plurality of chunks containing information relevant to the query;

identify as semantically similar chunks, top k relevant chunks from one or more of the plurality of chunks that are substantially relevant to the query, wherein k is a natural number;

iteratively select based at least on the metadata, neighboring chunks of the top k relevant chunks that are within a predetermined similarity distance of the top k relevant chunks as neighboring semantically similar chunks;

generate one or more extended chunks having sizes below a maximum size limit by combining the neighboring semantically similar chunks with the corresponding ones of the top k relevant chunks wherein the maximum size limit is based on a token limit of a foundation model;

store in the non-transitory processor-readable medium, the one or more extended chunks having sizes less than or equal to the maximum size limit;

select a subset of the one or more extended chunks based on one or more objectives; and input the query and the selected subset of the one or more extended chunks as context to the foundation model for retrieving relevant information from the foundation model.

2. The system of claim 1, wherein the instructions to identify the plurality of chunks substantially relevant to the query, further cause the at least one hardware processor to:

determine an order of similarity of the plurality of chunks to the query; and based on the order, select the top k relevant chunks.

3. The system of claim 1, wherein the instructions to identify one or more semantically similar chunks cause the at least one hardware processor to:

cease the iterative selection when one of the neighboring chunks fails to fall within the predetermined similarity distance, wherein the selected neighboring chunks are identified as the one or more semantically similar chunks.

4. The system of claim 3, wherein the neighboring semantically similar chunks of at least one of the top k relevant chunks occur sequentially with the relevant chunk in a source document.

5. The system of claim 1, wherein the instructions to identify the neighboring chunks, cause the at least one hardware processor to further:

access the metadata of the top k relevant chunks, wherein the metadata of a relevant chunk of the top k relevant chunks includes at least a hash value of the relevant chunk, a hash value of a previous chunk in a sequence of chunks including the relevant chunk and a hash value of a subsequent chunk of the relevant chunk in the sequence of chunks.

6. The system of claim 1, wherein the instructions to generate the one or more extended chunks cause the at least one hardware processor to:

generate corresponding vector embeddings of the top k relevant chunks with the appended text.

7. The system of claim 1, wherein the plurality of chunks is accessed by the non-transitory processor-readable medium storing instructions executed by the at least one hardware processor to:

create embeddings of the plurality of chunks using an embedding model; and store the embeddings in a vector database that enables the access of the plurality of chunks.

8. The system of claim 1, wherein the multiple objectives include at least chunk sizes, entities, topics, and similarity scores.

9. The system of claim 8, wherein the instructions to select a subset of the one or more extended chunks based on the multiple objectives cause the at least one hardware processor to:

execute a multi-objective optimization process with the multiple objectives as process parameters using one of Non-dominated Sorting Genetic Algorithm II (NSGA II) and Technique for Order of Preference by Similarity (TOPSIS) methods.

10. The system of claim 1, wherein the one or more extended chunks are of varied sizes.

11. A processor-executable method comprising:

generating, by a processor, a series of segmented chunks from continuous text input of documents, wherein the series of segmented chunks contain coherent information and each segmented chunk in the series of segmented chunks includes metadata descriptive of main content from a previous chunk and a next chunk in the series of segmented chunks;

identifying, by the processor from the series of segmented chunks, plurality of chunks that are substantially relevant to a query from an embeddings database storing embeddings of the chunked document text along with the metadata of the chunks;

identifying, by the processor, top k chunks of the plurality of chunks as semantically similar chunks for one or more of the plurality of chunks substantially relevant to the query, wherein k is a natural number;

selecting iteratively, by the processor based at least on the metadata, neighboring chunks of the top k relevant chunks that are within a predetermined similarity distance of the plurality of chunks as neighboring semantically similar chunks;

generating, by the processor, one or more extended chunks with sizes below a maximum size limit by combining the one or more semantically similar chunks with the respective one or more of the plurality of chunks, wherein the maximum size limit is based on a token limit of a foundation model;

storing, by the processor, in the non-transitory processor-readable medium, the extended chunks having sizes less than or equal to the maximum size limit;

selecting, by the processor, a subset of the one or more extended chunks based on one or more objectives; and inputting, by the processor, the query, and the selected subset as a context to a foundation model for retrieving relevant information from the foundation model.

12. The processor-executable method of claim 11, further comprising:

iteratively selecting, by the processor, the neighboring semantically similar chunks from the subset of the corresponding neighboring chunks based on topics and entities contained within the corresponding neighboring chunks and chunk sizes of the top k relevant chunks.

13. The processor-executable method of claim 12, wherein iteratively selecting the neighboring semantically similar chunks, further comprises:

accessing, by the processor, metadata of the top k relevant chunks, wherein the metadata of a relevant chunk of the top k relevant chunks includes at least a hash value of the relevant chunk, a hash value of a previous chunk in a sequence of chunks including the relevant chunk and a hash value of a subsequent chunk of the relevant chunk in the sequence of chunks.

14. The processor-executable method of claim 11, wherein identifying the subset of the corresponding neighboring chunks further comprises:

identifying, by the processor, the subset of the corresponding neighboring chunks that are within a predetermined similarity distance to the top k relevant chunks using one of cosine similarity, Euclidean similarity, Jaccard similarity, Pearson Correlation Coefficient.

15. A non-transitory processor-readable storage medium comprising machine-readable instructions that cause a processor to:

generate a series of segmented chunks from continuous text input of documents, wherein the series of segmented chunks contain coherent information and each segmented chunk in the series of segmented chunks includes metadata descriptive of main content from a previous chunk and a next chunk in the series of segmented chunks;

identify from the series of segmented chunks, a plurality of chunks that are substantially relevant to a query from an embeddings database storing embeddings of the chunked document text along with the metadata of the chunks;

identify top k chunks of the plurality of chunks as semantically similar chunks for one or more of the plurality of chunks substantially relevant to the query, wherein k is a natural number;

iteratively, by the processor, select neighboring chunks of top k relevant chunks that are within a predetermined similarity distance of the plurality of chunks as neighboring semantically similar chunks;

generate one or more extended chunks with sizes below a maximum size limit by combining the one or more semantically similar chunks with the respective one or more of the plurality of chunks, wherein the maximum size limit is based on a token limit of a foundation model;

storing, by the processor, in the non-transitory processor-readable medium, the extended chunks having sizes less than or equal to the maximum size limit;

select a subset of the one or more extended chunks based on one or more objectives; and input the query and the selected subset as a context to a foundation model for retrieving relevant information from the foundation model.

16. The non-transitory processor-readable storage medium of claim 15, wherein the machine-readable instructions that cause the processor to:

cease the iterative selection when one of the neighboring chunks is a non-similar chunk that fails to fall within the predetermined similarity distance.

17. The non-transitory processor-readable storage medium of claim 15, wherein the machine-readable instructions to generate one or more extended chunks further cause the processor to:

append text of the neighboring semantically similar chunks to corresponding ones the top k relevant chunks while ensuring that sizes of the top k relevant chunks stay below a maximum size limit;

generate corresponding vector embeddings of the top k
relevant chunks with the appended text.

* * * * *